Figure 2A:
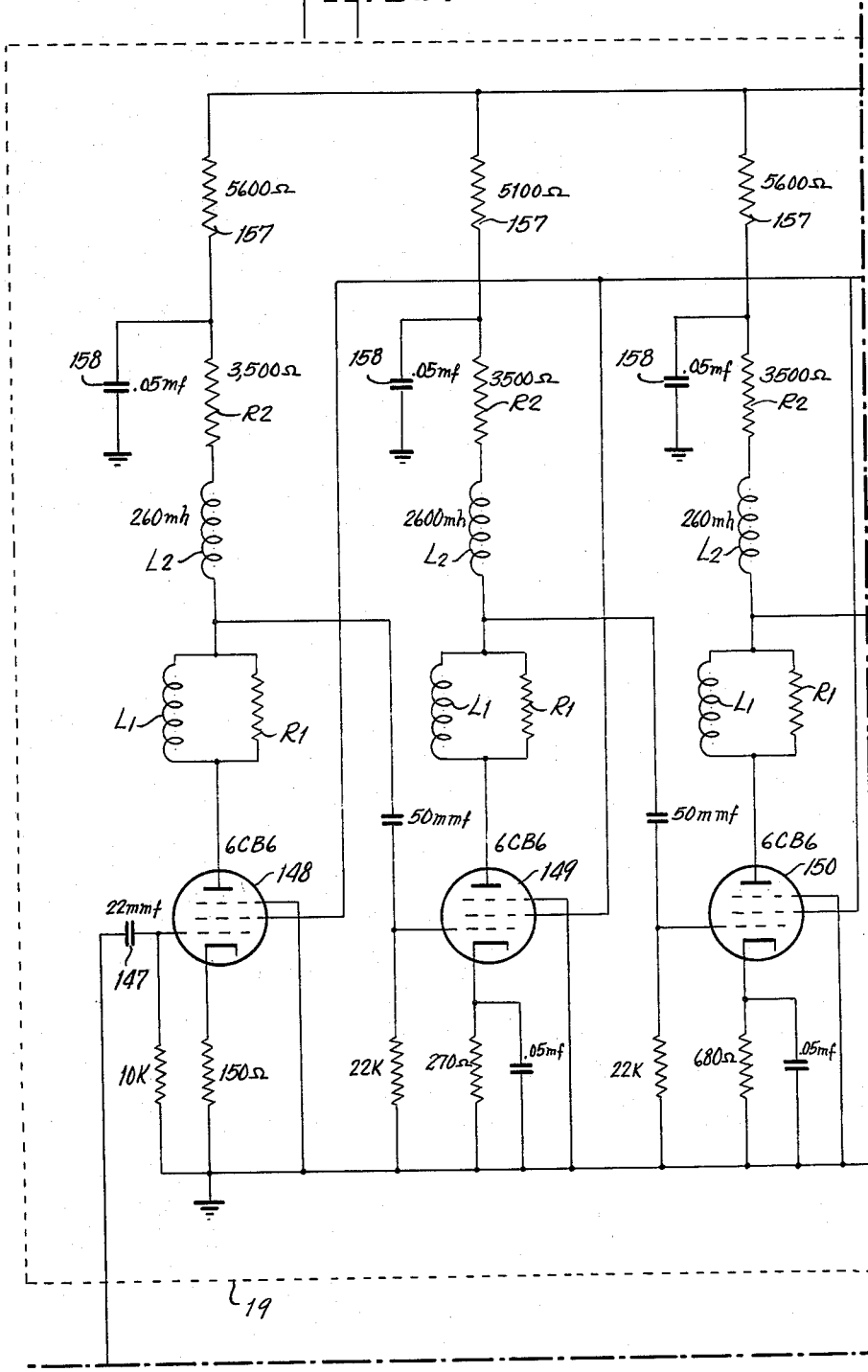
Figure 2B:
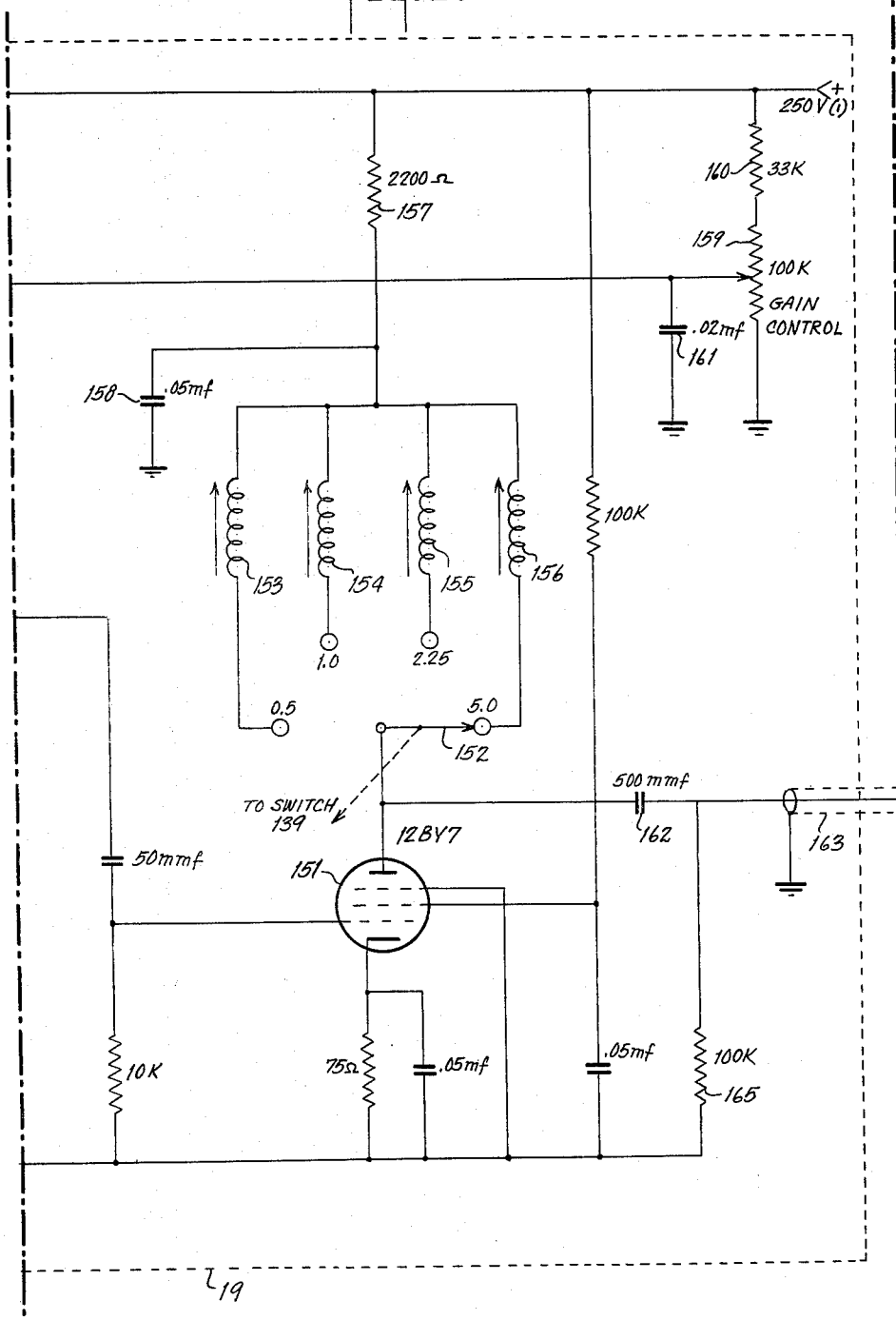
Figure 2E:
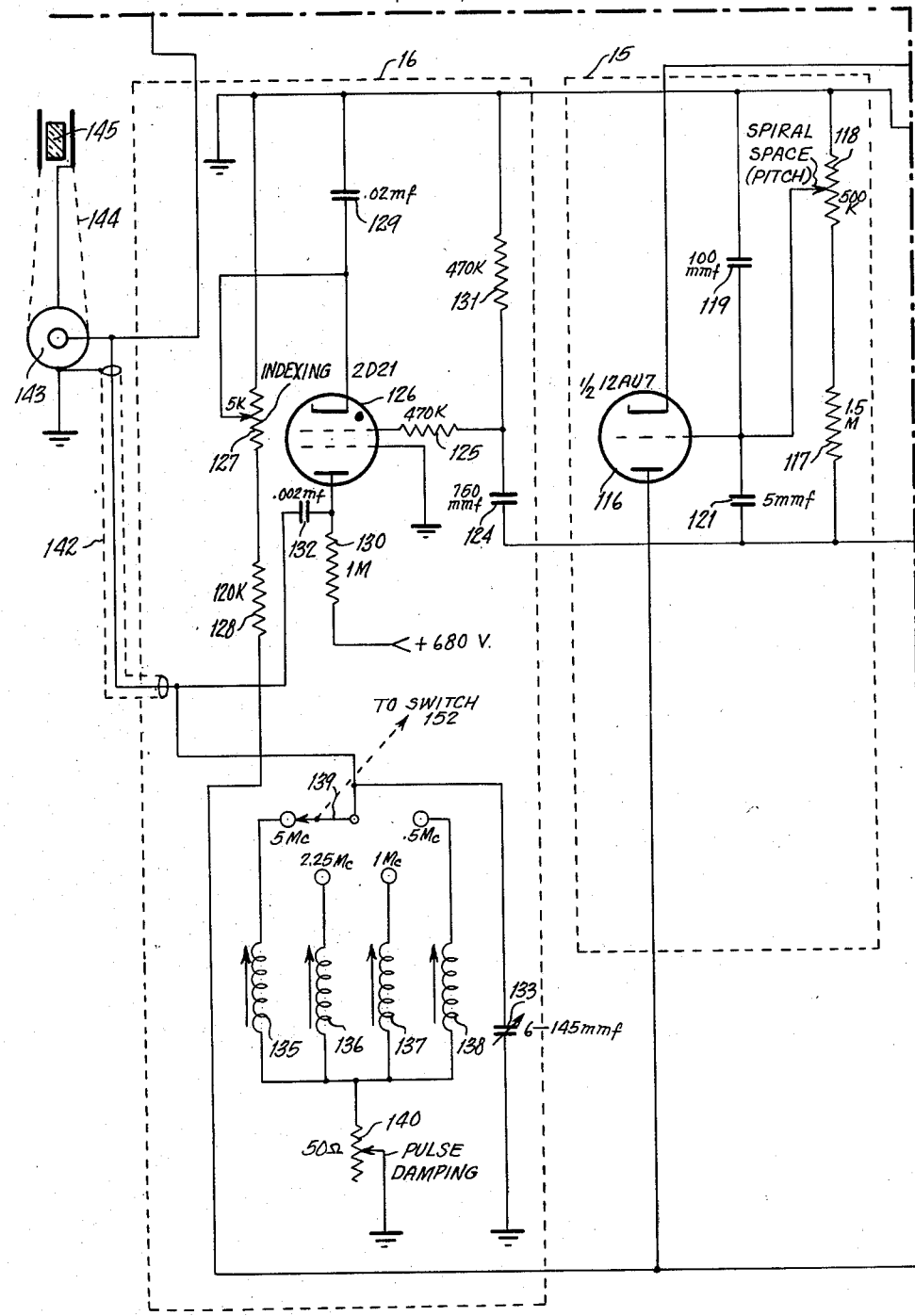

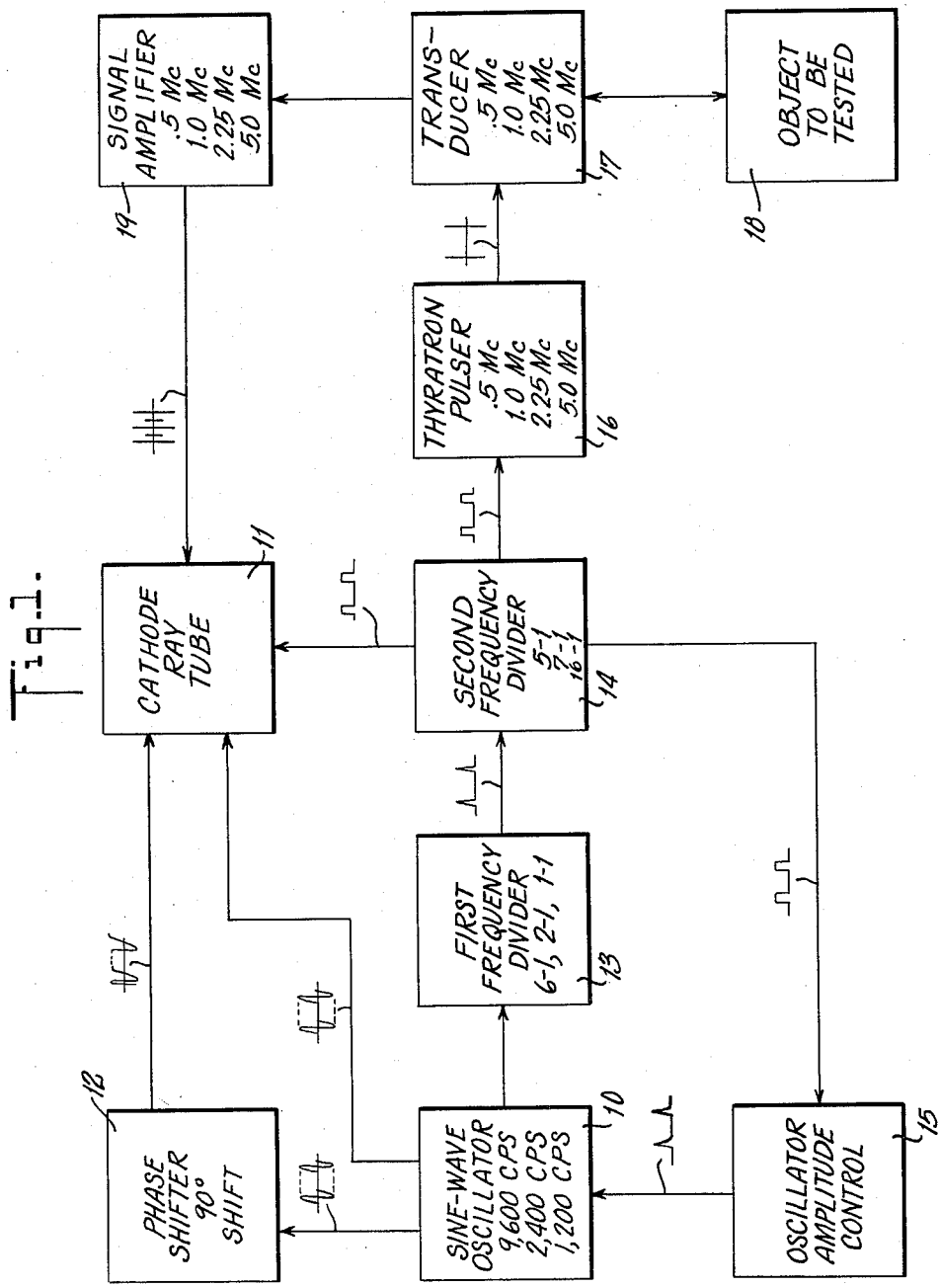

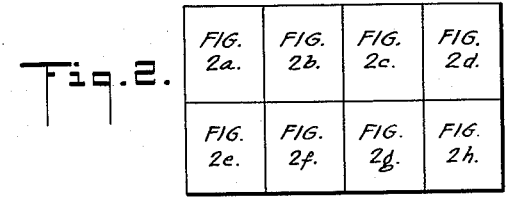
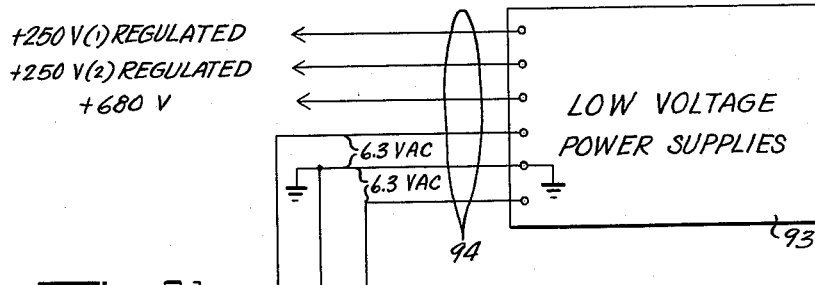
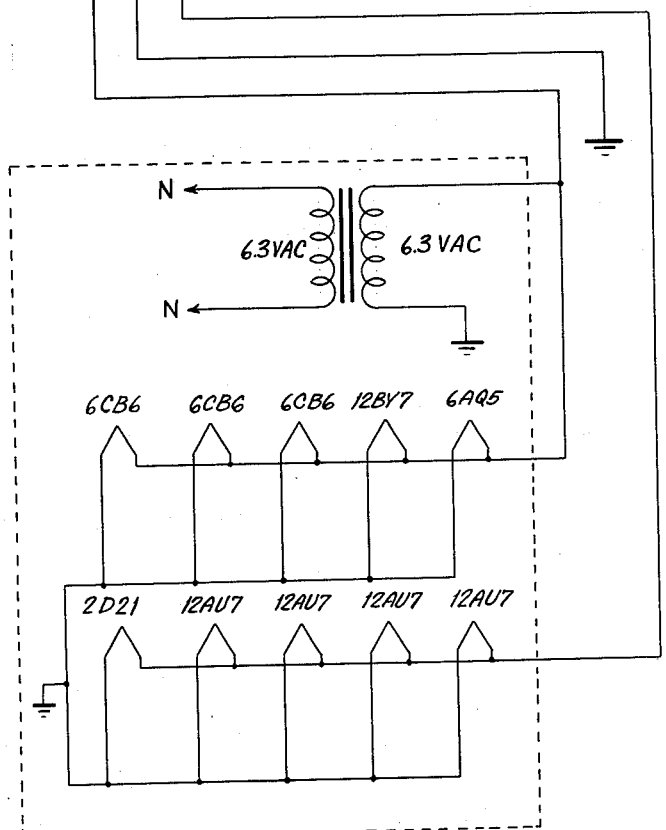
Fig. 2h.

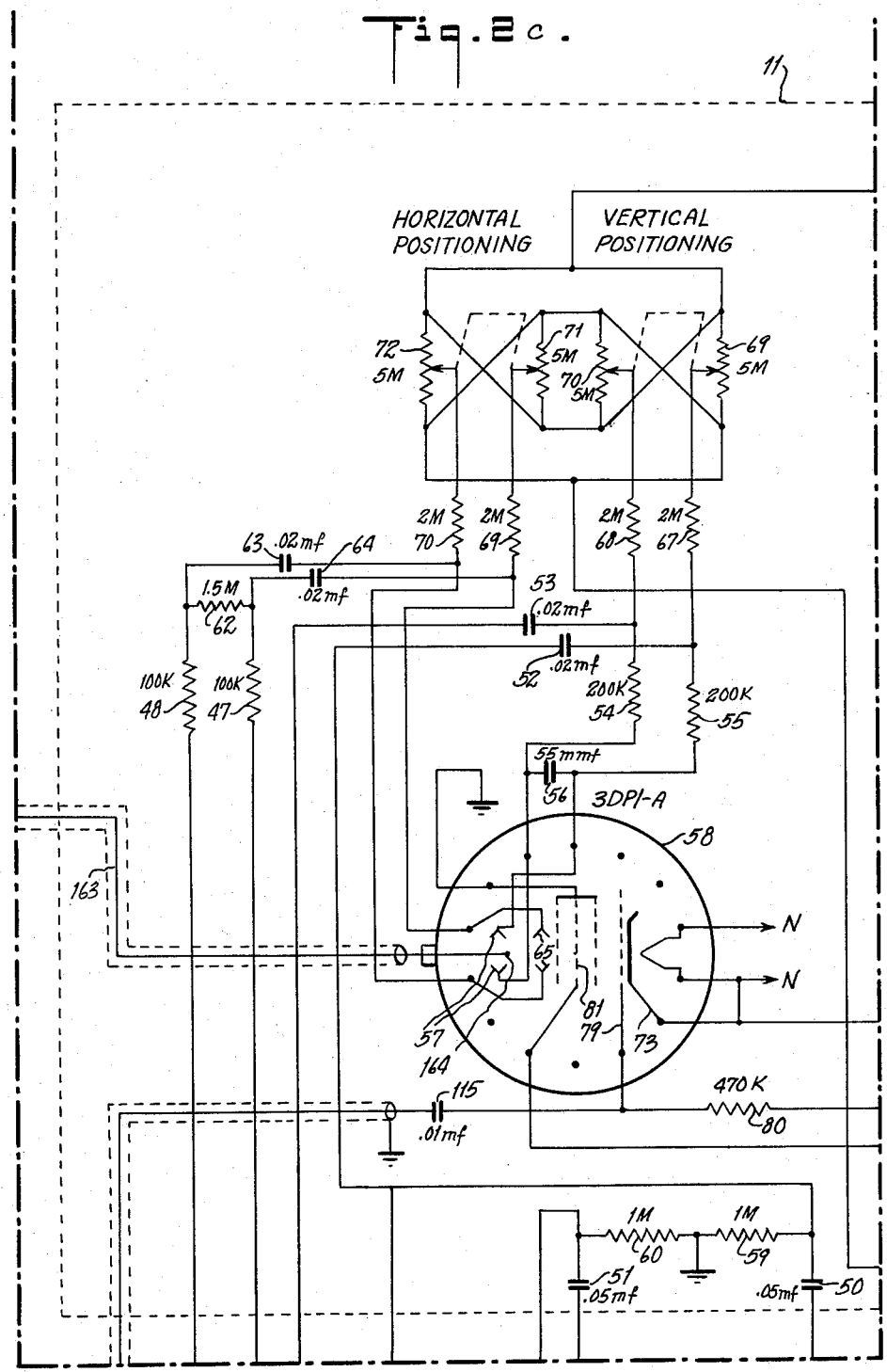

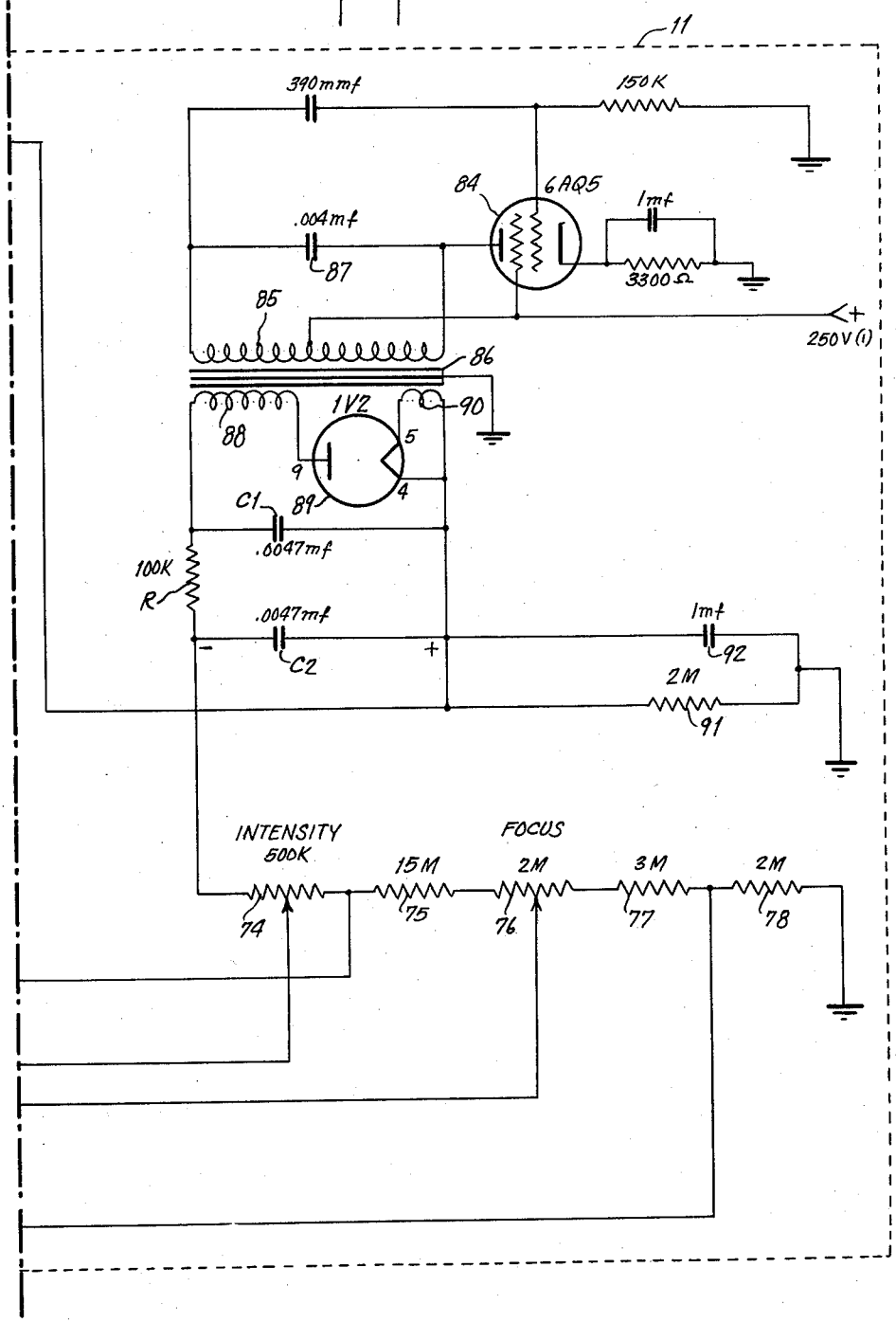

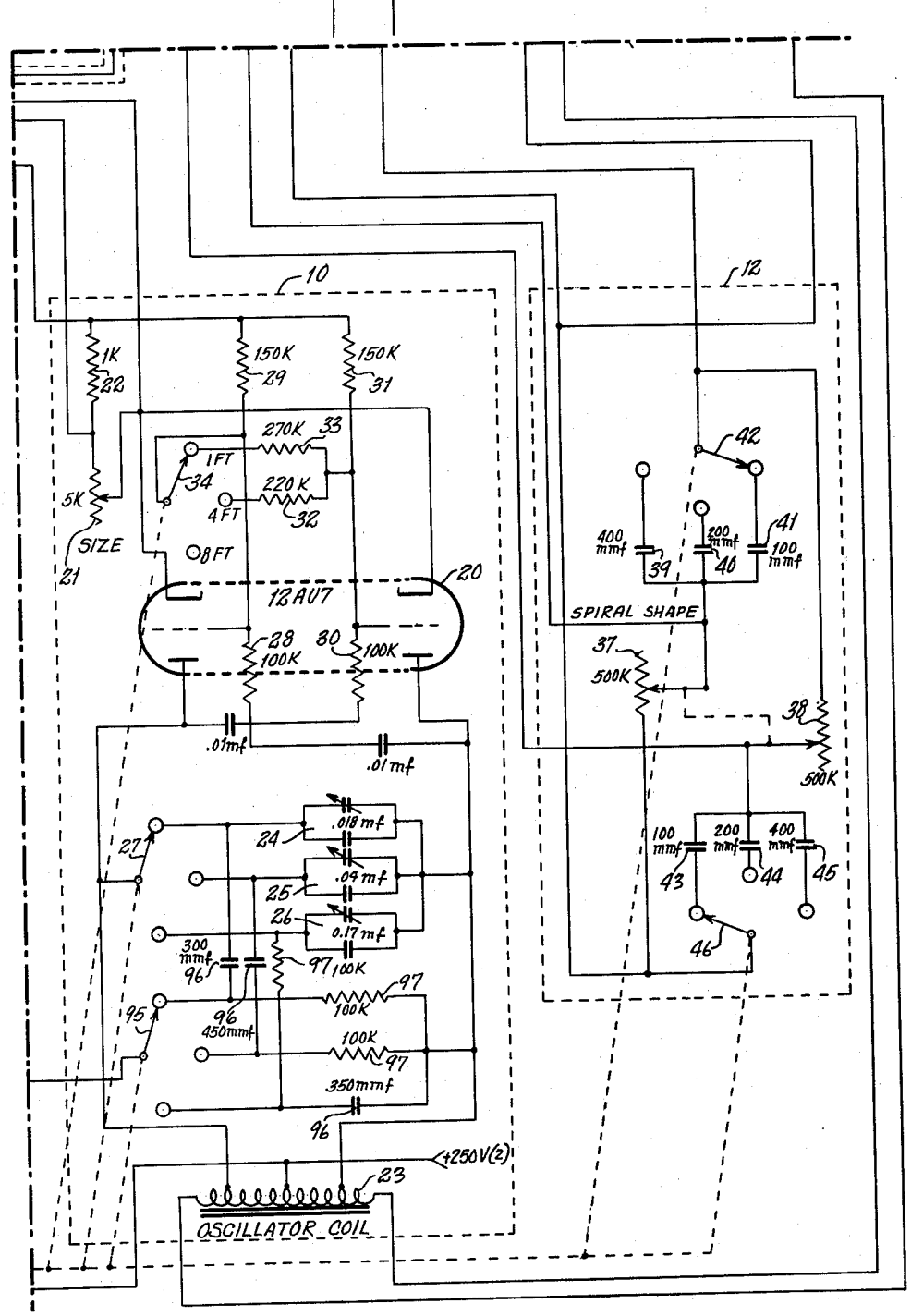

United States Patent Office 3,144,764
Patented Aug. 18, 1964

3,144,764
ULTRASONIC INSPECTION SYSTEM
William C. Harmon, Chagrin Falls, Ohio, assignor to Republic Steel Corporation, Cleveland, Ohio, a corporation of New Jersey
Filed Oct. 1, 1958, Ser. No. 764,534
17 Claims. (Cl. 73—67.8)

The present invention relates to ultrasonic inspection systems and equipment having particular utility in detecting the presence and location of certain types of defects and flaws in solid metallic bodies such as finished or semi-finished rods, shafts, forgings, and the like.

In the art of steel-making, large quantities of metal refined at one time are formed into a convenient size and shape for rolling and forging by pouring the molten metal into molds of appropriate dimensions to form ingots of desired and uniform shape and size. A prerequisite to faultlessly finished products fabricated from ingots is an essentially perfect ingot free from all cavities or openings and made up of material that is homogeneous throughout. Unfortunately the natural laws that govern the solidification of the liquid metal operate against both of these requirements, and result in development of the well known natural defects in ingots called piping, blow holes, segregation, columnar structure and internal fissures.

The detection of certain of these faults in ingots and products fabricated therefrom has been facilitated in more recent times by use of so-called ultrasonic detectors. These operate upon the principle that certain defects, such as piping and fissures, will cause reflection of ultrasonic energy impressed upon a surface of a metal body such as that of the ingot or an article formed from the ingot. A transducer device is conventionally used to impress such ultrasonic energy upon the body to be tested and to receive reflected ultrasonic energy from the body. In use, the transducer device is placed against a surface of the body and is shock excited by a short pulse of electrical energy whereby a short train of ultrasonic mechanical test oscillations is generated by the device. This train of ultrasonic energy travels through the body and is reflected by certain types of the imperfections present. The reflected ultrasonic energy travels back to the surface of the body and is impressed on the transducer device, which transforms it into electrical oscillations. The latter are then suitably amplified and are conventionally displayed on the screen of a cathode ray tube. Such display not only indicates the presence of certain known types of imperfections in the body, but also enables the distance of the imperfections from the test surface to be indicated. This form of flaw detection system, while originally used to detect imperfections in ingots, is now widely used for the detection of similar or analogous types of flaws in semi-finished and finished products such as rods, shafts, forgings and the like.

Ultrasonic inspection equipments heretofore available have required large and cumbersome structures of appreciable weight, and have been characterized by the use of an excessive number of operating controls which in practice are critical to adjust and require frequent readjustments during even moderate periods of operation. They have accordingly required special facilities to transport them to and around an inspection site, and require the use of highly trained and skillful operators to adjust and operate them.

Furthermore, the cathode ray tube indicator heretofore employed in these inspection equipments has been operated with a linear scanning trace having a repetition rate corresponding to the conventional fifty-cycle or sixty-cycle power line frequency. This relatively low repetition rate has resulted in an exceedingly dim image, making it necessary to shield the face of the cathode ray tube from ambient light in order to view the image. Calibration of the linear trace, for purposes of measuring the distance of imperfections from the inspection surface, has conventionally been accomplished by a series of small amplitude square waves which are superimposed upon the linear trace. The square wave periodicity, and thus the spacing between square wave cycles on the trace, is made adjustable for purposes of varying the distance calibration scale.

In using this form of calibration, the usual procedure is to take an object of known dimensions and homogeneous material and adjust the number of square wave cycles employed to correspond with the known dimensions of the object. There is the serious disadvantage in using this form of distance calibration that the reflected echo pulses from the object under test obscure the square wave calibration marks and so make accurate distance measurements extremely difficult. This defect is particularly objectionable where large objects are inspected since in this case the round-trip transit time of the inspection pulse through the object is relatively long and the calibration square waves must be spaced so close together that counting them requires the use of a pointer stylus plus a great deal of time and patience, conditions which render readings to close tolerances virtually impossible. In addition to these disadvantages, the generator of the square wave calibration marks has in practice tended to be unstable in its operating frequency. This has the further disadvantage that the positions of the displayed calibration square waves tend to drift to some extent, and in practice has made it necessary to recheck and reset the position and number of the calibration square waves at fairly frequent operating intervals.

It has heretofore been conventional in these inspection equipments to employ a relatively small cathode ray tube of approximately five-inch diameter, since the use of larger tubes reduces the already excessively dim trace image which is produced for the reason previously mentioned. This means that imperfections at maximum distance in the object tested must be displayed on a trace line of five-inch length or less. This length of trace may be satisfactory for use in testing small objects, but does not furnish accurate distance measurements for large objects as when testing long shafts of from tweny to thirty foot lengths where the compression of the calibration marks and the indications from significant variables in the object tested make accurate distance readings impossible and lead to substantial confusion and errors in interpretation.

It is an object of the present invention to provide a new and improved ultrasonic inspection system and apparatus of exceptionally compact and sturdy yet light weight construction enabling it to be easily carried by hand and to be readily used in confined quarters.

It is a further object of the invention to provide a novel ultrasonic inspection system and apparatus characterized by high operating stability and sensitivity and substantially improved accuracy of flaw indication over a wide range of indication conditions.

It is an additional object of the invention to provide an ultrasonic inspection system and apparatus having a minimum number of operating adjustments, which may be effected in a simple manner and at will to operate with high stability over a wide range of test conditions providing optimum detection of diverse flaw characteristics.

It is yet a further object of the invention to provide a novel ultrasonic inspection system and apparatus which enables the use of a smaller size of cathode ray tube than heretofore feasible and yet enables the effective attainment of a much longer sweep trace, and thus much higher accuracy of indication, than has heretofore been readily possible.

Other objects and advantages of the invention will appear as the detailed description proceeds in the light of the drawings forming a part of this application and in which:

FIG. 1 represents in block diagram form an ultrasonic inspection system and equipment embodying the present invention in a particular form; and FIGS. 2a–2h considered together as indicated in FIG. 2 show the detailed electrical circuit arrangement of an ultrasonic inspection system and apparatus embodying the present invention.

Referring now more particularly to FIG. 1, an ultrasonic inspection system and apparatus embodying the present invention includes a sine wave oscillator 10 which may be manually controlled to operate at any of three selectable operating frequencies. These are 9.6 kilocycles per second, 2.4 kilocycles per second, and 1.2 kilocycles per second, and are selected according to the test conditions as will hereinafter be explained. The sinusoidal voltage generated by the oscillator 10 is applied directly to one set of deflection plates of a cathode ray tube 11, and is applied through a 90° phase shifter 12 to a second set of deflection plates oriented normal to the first set of deflection plates. These two voltages, applied with equal amplitudes to the tube 11, produce a circular trace on the cathode ray tube screen as is well known.

The sinusoidal voltage developed by the oscillator 10 is also applied to a first frequency divider 13 which generates an output voltage of pulse or "spike" wave form. The frequency divider 13 provides a six-to-one frequency division ratio when operation of the oscillator 10 is at 9.6 kilocycles per second, provides a frequency division ratio of two-to-one for operation of the oscillator 10 at 2.4 kilocycles per second, but provides no frequency division (i.e. a one-to-one ratio) when the oscillator 10 operates at 1.2 kilocycles per second. The output voltage of the divider 13 is applied to a second frequency divider 14 which generates an output voltage of approximately square-wave pulse wave form having for the three respective last-mentioned operating frequencies of the oscillator 10 one generated pulse for each group of five, seven, and sixteen spike pulses generated by the frequency divider 13.

The output voltage of the frequency divider 14 is applied to an oscillator amplitude control unit 15, which generates an output current of approximately linear sawtooth wave form during each pulse interval of the applied pulse voltage. This current is used to reduce progressively and approximately linearly with time the amplitude of the sine wave voltage generated by the oscillator 10 with the result that a spiral trace rather than a circular trace is formed on the screen of the cathod ray tube 11. At the same time, the output voltage of the frequency divider 14 is applied to the intensity control electrode of the tube 11. Each pulse of the applied voltage is effective to brighten the tube trace and make only the spiral trace portion of its cathode ray beam deflection visible. The only visible trace pattern thus produced by the tube 11 is the spiral trace, which by manual adjustments may be established at will and as desired to be constituted by any number of complete or partial trace convolutions from a minimum of one to a maximum of six and with adjustable trace spacing or pitch.

The output voltage of the frequency divider 14 is also applied to a thyratron pulser 16 to render the thyratron thereof conductive substantially simultaneously with the initiation of the visual spiral trace by the cathode ray tube 11. Upon becoming so conductive, the unit 16 develops and applies to a transducer 17 a short pulse-type train of electrical oscillations having the same frequency as the latter and which shock excite it at its resonant frequency. The transducer 17 may be a quartz crystal or any of various ceramic compounds, such as barium titanate, having similar operating characteristics. Transducers having any of four frequencies of natural resonance are selected for use; namely transducers having a resonant frequency of 0.5 megacycle, 1.0 megacycle, 2.25 megacycles and 5 megacycles according to whether the flaw to be detected is located in material with coarse-grain through intermediate-grain to fine-grain structure characteristics. The transducer 17 upon being so shock excited generates and applies to the surfaces of an object 18 to be tested a brief pulse or train of high frequency ultrasonic mechanical energy. This pulse of ultrasonic energy is reflected both by the opposite surface of the object 18 and by any flaws located intermediate to its surfaces, and after a transit-time interval these ultrasonic reflections or echoes are received back and impressed upon the transducer 17 which reconverts them from mechanical energy to electrical potential oscillations. These oscillation echo pulses are applied to a broad band amplifier 19 having its input circuit closely coupled to the output circuit of the thyratron pulser 16, and thus effectively tuned to the resonant frequency of the transducer 17 and having its output circuit also tuned to the resonant frequency of the transducer 17. The electrical oscillation echo pulses are amplified by the amplifier 19 and are applied to a radial deflection electrode of the tube 11 to display each reflected echo pulse as a radial "pip" on the spiral trace of the tube 11.

For objects of relatively small dimensions of the order of one foot or less, one convolution of the spiral trace of the cathode ray tube 11 and a frequency of oscillation of the oscillator 10 of 9.6 kilocycles is sufficient to display all of the information resulting from a test. For larger objects to be tested, the pulse duration of the output voltage of the frequency divider 14 is increased so that a larger number of convolutions of the spiral trace appear on the screen of the cathode ray tube 11. For an operating frequency of 9.6 kilocycles of the oscillator 10, the width of the output pulses of the unit 14 may be increased in duration to such extent that the spiral trace has a maximum of six complete convolutions and thus provides an overall trace interval adequate to display all of the information resulting from the test of a body having a maximum depth or length of six feet. Still larger or longer objects are tested by manually changing the operating frequency of the oscillator 10 to either 2.4 kilocycles per second or 1.2 kilocycles per second. For an operating frequency of 2.4 kilocycles per second, one convolution of the spiral is equivalent to four feet of depth or length of the object tested, and at 1.2 kilocycles per second one turn of the spiral is equivalent to eight feet of the depth or length of the object tested. Thus with the oscillator 10 adjusted to operate at 1.2 kilocycles per second and the duration of the output potential pulses generated by the frequency divider 14 selected to produce six convolutions of the spiral trace by the tube 11, an object having a forty-eight foot depth or length may be tested and all of the information resulting from the test displayed.

The choice of frequency to be selected for the transducer 17, and the corresponding tuning of the outputs circuits of the thyratron pulser 16 and amplifier 19, is chosen in dependence upon the structure of the material under inspection. Large objects with coarse structures require a transducer with relatively low resonant frequency whereas small objects with fine structures require a transducer having high resonant frequency.

The detailed electrical circuit arrangements of the various components represented in conventional form in FIG. 1 are shown in FIGS. 2a–2h which are considered together as a unitary system as indicated in FIG. 2.

*Sine Wave Oscillator 10*

The sine wave oscillator 10 provides the basic timing of the inspection system, and has manual provision for selection of any of three operating frequencies. These frequencies are so selected that one complete convolution of the trace on the cathode ray tube provides sufficient time for an ultrasonic pulse of energy to penetrate and reflect back as an echo from the following distances in a steel test piece: 9600 cycles per second provides one foot of penetration per trace convolution; 2400 cycles per second provides four feet of penetration per trace convolution; and 1200 cycles per second provides eight feet of penetration per trace convolution. As many as six convolutions of the spiral trace may be displayed on the cathode ray tube, thus giving maximum ranges of penetration six times the distances just enumerated.

The oscillator 10 is of the balanced push-pull type utilizing two triode tube sections enclosed within a common tube envelope 20. The control grid of one is coupled to the anode of the other, and the cathodes are connected to ground potential through a common adjustable resistor 21 and fixed resistor 22. The resistor 21 is arranged for manual adjustment to provide control over the maximum amplitude of oscillation and thus the maximum diameter of the trace produced on the screen of the cathode ray tube. In this, it will be noted that adjustments of the resistor 21 vary the cathode bias of both triode tube sections and this in turn varies the average value of anode current of the latter; increasing the average value of anode current increases the amplitude of oscillation and vice versa. The resistor 22 merely insures that the total cathode resistance may not be reduced below a minimum safe value by manual adjustments of the resistor 21.

The anodes of the triode tube sections are connected to an autotransformer 23 having a center tap connected to a source of unidirectional energizing potential as indicated in the drawing. The autotransformer 23 is tuned to the three operating frequencies previously mentioned by three groups of condensers 24, 25 and 26, individually selectable by manual positioning of a switch 27, with each comprised by a fixed condenser and an adjustable trimmer condenser for accurate frequency setting. The transformer 23 has a voltage step-up ratio of two-to-one between the anode taps and its end terminals, and preferably utilizes a core of the magnetic ceramic type characterized by high permeability, low eddy current losses, light weight, and compact size. A transformer utilizing such core may have dimensions of the order of 2¾ inches by 1¼ inches by 2¼ inches, may weigh less than ½ pound, and is characterized by such high efficiency that an average anode current of eight milliamperes for each of the two triode tube sections of the tube 20 is capable of generating a voltage of the order of 700 volts across the end terminals of the transformer 23. This relatively small value of anode current does not cause appreciable heating of the transformer, and thus results in an insignificant change of the electrical characteristics of the transformer with consequent high degree of frequency and amplitude stability of the generated oscillations. In fact, the frequency stability of the oscillator when using such transformer has been found in practice to be so good that no perceptible change in the indicated length of a calibration body tested is indicated even after four to eight hours of daily operation over an operating interval of six months. This enables the inspection system equipment to be calibrated at the factory when built and to need no further adjustment unless repaired.

Feedback energy from the output circuit of one triode tube section to the input circuit of the other is reduced by a potential divider comprised by series resistors 28, 29 for one tube section and 30, 31 for the other so that neither control grid is overdriven (that is, neither draws any appreciable grid current) to minimize distortion of the wave form of the generated oscillations. A resistor 32 or a resistor 33 may be connected between the control grids of the oscillator tube triode sections by operation of a switch 34, unicontrolled with the switch 27 as indicated by the broken lines. It is the purpose of these resistors to introduce additional losses and compensate for variations in efficiency of the oscillator at its several selectable operating frequencies, thereby maintaining the amplitude of oscillations substantially constant as between each of the three operating frequencies.

*Phase Shifter 12*

The phase shifter 12 (FIG. 2g) is of conventional arrangement and operates to develop a voltage displaced 90° in phase with respect to the voltage which is generated across the terminals of the oscillator transformer 23 and is applied directly to one pair of deflecting electrodes of the cathode ray tube. As is well known, this voltage directly applied to one pair of deflecting electrodes and the 90° phase-displaced voltage applied to a second pair of quadrature positioned electrodes of the cathode ray tube produces a circular trace of the cathode ray beam of the cathode ray tube.

The phase shifter includes dual adjustable resistors 37, 38, which are mechanically connected as indicated by the broken line for concurrent adjustment of their resistance values in opposite senses. The resistor 37 is connected in series with any of three condensers 39, 40 and 41, individually selectable by operation of a switch 42 mechanically connected for unicontrol operation with the switch 27 as indicated by the broken line, across the terminals of the oscillator transformer 23. The resistor 38 is similarly connected in series with any of three condensers 43, 44 and 45, individually selectable by operation of a switch 46 mechanically connected for unicontrol operation with the switch 42 as indicated by the broken lines, across the terminals of the oscillator transformer 23. The voltage developed at the juncture of the resistor 37 and any of the condensers 39, 40 and 41 with respect that developed at the juncture of the resistor 38 and any of the condensers 43, 44 and 45 is displaced 90° in phase with respect the terminal voltage of the oscillator transformer 23. This 90° phase-displaced voltage is applied through series resistors 47 and 48 (FIG. 2c) to the quadrature positioned electrodes of the cathode ray tube.

The operations of the unicontrolled switches 42 and 46 with that of the oscillator switch 27 is such that the proper value of the capacitors 39-41 and 43-45 is included in circuit in the phase shifter 12 to produce the desired 90° phase shift at each of the three oscillator operating frequencies. The dual resistors 37 and 38 are arranged for ready manual adjustment to compensate for any slight discrepancy in the spiral trace configuration when changing from one oscillator frequency to another.

*Cathode Ray Tube and High Voltage Power Supply*

The cathode ray display unit 11 may conveniently use a cathode ray tube of the 3DP1-A type (FIG. 2d) which has a three-inch diameter fluorescent screen and includes two pairs of quadrature-positioned deflecting electrodes and a radial deflecting electrode.

The voltage developed across the terminals of the oscillator transformer 23 is applied through series coupling condensers 50, 51 and 52, 53, through series resistors 54 and 55, and through a shunt condenser 56 directly to one pair of deflecting electrodes 57 of the cathode ray tube 58. Two resistors 59 and 60 are connected in series across this deflection circuit and the juncture of the resistors is grounded to maintain the average potential of the deflection circuit at ground potential. The series resistors 54 and 55 and the shunt condenser 56 constitute a frequency sensitive compensating circuit which slightly adjusts the voltages as applied to the deflection electrodes 57 as necessary on some cathode ray tubes to keep the ultimate spiral trace from becoming somewhat elliptical in shape. The values selected for these compensating components vary slightly with individual variations prevailing in the same type of cathode ray tube, and also compensate for slight changes in the wiring length and dress and the component layout as between production models of the inspection system. Accordingly, it will be found in practice that some cathode ray tubes and some inspection equipments may dispense with these compensating network components.

The sinusoidal voltage developed across the end terminals of the oscillator transformer 23 is also applied to the phase shifting network 12 as earlier mentioned, and the 90° phase shifted voltage derived by the latter is applied through the series resistors 47 and 48, a shunt resistor 62, and series coupling condensers 63 and 64 to a second pair of deflecting electrodes 65 provided in the cathode ray tube 58 and positioned normal to the deflecting electrodes 57. The series resistors 47, 48 and the shunt resistor 62 constitute a voltage divider network effective slightly to decrease the voltage applied to the deflecting electrodes 65 in order that there shall be produced a perfectly circular spiral trace on the cathode ray tube screen. In practice, some cathode ray tubes and circuit component layouts may not need this resistive voltage divider network and in these instances it may be dispensed with.

There is also applied to the deflecting electrodes 57, through series decoupling resistors 67 and 68, a unidirectional centering voltage derived from vertical positioning potentiometers 69 and 70. The latter are uncontrolled, as indicated by the broken line, and are connected in conventional manner across a voltage source presently to be described. In similar manner, there is applied to the deflecting electrodes 65 through series decoupling resistors 69 and 70 a unidirectional centering potential derived from horizontal positioning potentiometers 71 and 72, mechanically connected for unicontrolled operation as indicated by the broken line, which are connected in conventional manner across the source of voltage last mentioned.

The cathode 73 of the tube 58 is connected to the positive potential end of a cathode ray beam intensity control potentiometer 74 which is included with a fixed resistor 75, a focus potentiometer 76, and fixed resistors 77 and 78 in a conventional voltage divider arrangement connected across the output of the high voltage supply presently to be described. The control electrode 79 of the cathode ray tube 58 is connected through a series isolating resistor 80 to the movable contact of the potentiometer 74, and a focus control electrode 81 of the tube 58 is connected to the adjustable contact of the focus potentiometer 76.

The high voltage power supply system supplies an output unidirectional voltage of approximately 2200 volts at approximately 200 microamperes. It includes a conventional form of high frequency oscillator utilizing a tetrode vacuum tube 84 having its anode and control electrode coupled to the terminals of a tapped primary winding 85 of a transformer 86. The winding 85 is tuned to an operating frequency of approximately 7.5 kilocycles per second by a condenser 87. The transformer 86 preferably uses a magnetic ceramic type of core, and includes a high voltage secondary winding 88 having one terminal connected to the anode of a diode type of rectifier tube 89. The latter has a filament connected to a winding 90 provided on the transformer 86. The high unidirectional voltage thus obtained by rectification of the generated oscillations is applied through a filter network, comprising shunt condensers C1 and C2 and a series resistor R, to the terminals of the potential divider 75–78. The latter also includes a fixed resistor 91, having a condenser 92 connected in shunt thereto, to provide with the resistor 78 sources of voltage of negative and positive polarities with respect to ground and suitable for application to the centering potentiometers 69–72. The high voltage power supply system with its magnetic ceramic core transformer 86 may have an exceptionally compact and easily shielded construction occupying a total volume of only 2¼ inches by 1¼ inches by 2¼ inches and may easily be constructed to have a weight not exceeding one pound. Its operating frequency of approximately 7.5 kilocycles is sufficiently high to be readily filtered by filter components of small physical size yet is of sufficiently low frequency that any stray energy components which may be coupled into the amplifier at either the fundamental or harmonic frequencies of the power supply have insignificant effect on the operation of the inspection system.

The inspection system herein described is constructed with all low voltage unidirectional power supplies, 93, of conventional construction and therefore not shown in one cabinet connected by a cable 94 (which may be of the order of thirty feet or more) to the components of the inspection system housed in a second cabinet and of such compact construction and light weight that it may readily be carried by hand to the inspection site. Since it is desirable to keep the heater supply current through the relatively long connecting cable 94 to as low a value as possible, the heater filaments of the several tubes used in the inspection system are connected in two parallel groups as shown in FIG. 2h with one group consuming as nearly equal power as the other group. The two heater supplies are then connected in series to a grounded center-tap 12.6 volt alternating current sources in the power supply 93. This reduces the heater current to one-half the value which it would have if all of the heaters were connected in parallel, and the resulting voltage drop in the interconnecting cable 94 is therefore not sufficiently great as to have any appreciable effect on the heaters of the inspection system tubes. It will be noted that one side of the heater circuit in each heater group is grounded and, since both groups draw substantially the same heater current, no appreciable current flows in the center-tap ground lead of the interconnecting cable thereby to minimize possible sixty-cycle power supply modulation interference stray coupling into the circuits of the inspection system.

*First Frequency Divider 13*

The first frequency divider 13 is coupled to the oscillator 10 through one of three selectable phase shifting networks which are included in the oscillator 10 and are individually selectable by a switch 95 mechanically connected, as indicated in broken lines, for unicontrol operation with the oscillator switch 27. Each of these networks is selectively connected by the switch 27 between the anodes of the oscillator tube 20, and each includes a condenser 96 connected in series with a resistor 97. The juncture of each condenser 96 and its associated resistor 97 is connected to one contact of the switch 95. The sinusoidal voltage thus supplied to the first frequency divider 13 has such phase, as established by the phase shifting networks, that the spiral trace produced on the screen of the cathode ray tube will always start at the same point (for example, the twelve o'clock position) of the cathode ray tube screen at each operating frequency of the oscillator 10.

Figure 2F:
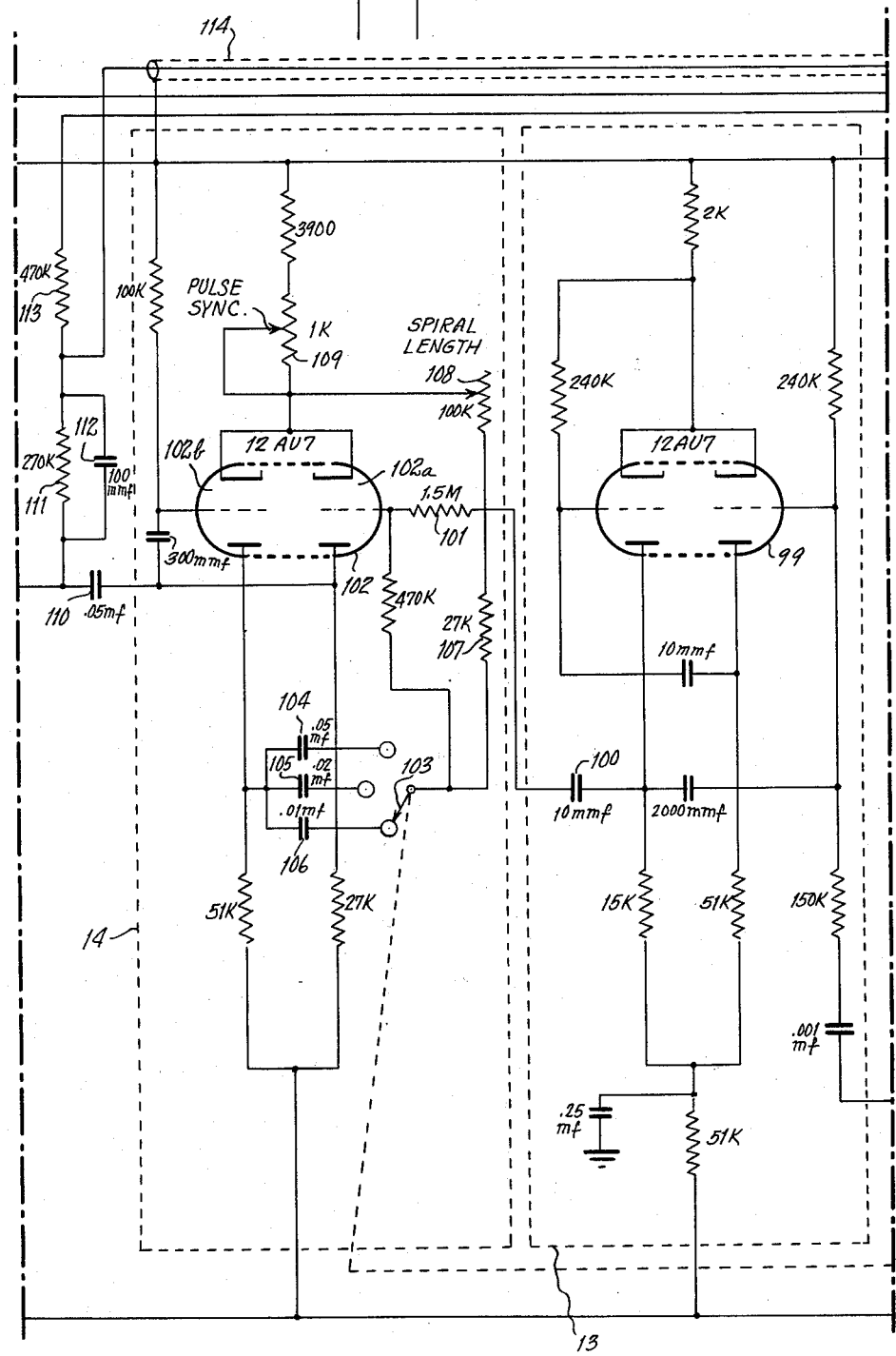

The first frequency divider is comprised by a multivibrator utilizing a dual triode form of tube 99 (FIG. 2f). The input and output electrodes of the two triode sections of the tube 99 are interconnected in conventional manner as shown, and the circuit constants are so selected as to provide one output voltage pulse or spike for each six cycles of the oscillator 10 when the latter operates at 9.6 kilocycles per second, to provide one output voltage pulse or spike for every two cycles of the oscillator when the latter operates at 2.4 kilocycles, and to produce one output voltage pulse or spike for each cycle of the oscillator when the latter operates at 1.2 kilocycles per second.

*Second Frequency Divider 14*

The pulse output potential of the first frequency divider 13 is coupled through a condenser 100 and a series isolating resistor 101 to the control electrode of a first triode section 102a of a dual triode form of tube 102. The input and output electrodes of the second triode section 102b of the tube 102 are cross-coupled in conventional manner as shown to the respective output and input electrodes of the triode section 102a to provide a conventional form of multivibrator operating to develop positive output potential pulses of substantially rectangular pulse wave form. The pulse period of this output potential is selected by suitable switch-selected choice of values of the multivibrator components, in a manner well known, to be five, seven and sixteen times as long as the output potential pulse period of the first frequency divider 13, thus providing a further frequency division of five, seven and sixteen times.

For reasons which will presently be explained more fully, the pulse duration of the output potential of the second frequency divider 14 determines the length of the spiral trace produced on the screen of the cathode ray tube 58. Since one spiral trace convolution is produced during each cycle of operation of the oscillator 10, the minimum value of output potential pulse duration of the frequency divider 14 is so established by selection of component values as to correspond to the period of one cycle of the oscillator 10 at each of the three selectable operating frequencies of the latter. These minimum values of pulse duration each may be lengthened under manual control to adjust the length of the spiral trace from a minimum of one trace convolution to a maximum of six trace convolutions. This selection and control of the output potential pulse duration of unit 14 is accomplished by suitable selection and adjustment of the time constant of those circuit components which couple the output circuit of the tube section 102b to the input circuit of the tube section 102a. To this end, a switch 103, mechanically connected for unicontrol operation with the frequency selection switch 27 of the oscillator 10 as indicated in broken lines, selects one of three condensers 104, 105 and 106 according to the selected operating frequency of the oscillator 10. It will be noted that the condenser thus selected is connected in series with a fixed resistor 107 and a manually adjustable resistor 108 across the output electrodes of the tube section 102b. The time constant of the selected one of the condensers 104, 105 and 106 and the resistor 107 is so selected that when the resistor 108 is manually adjusted to have zero value the aforementioned minimum pulse duration of the output potential of the unit 14 is established for each operating frequency of the oscillator 10. This minimum pulse duration may then be increased by manual adjustment of the resistor 108 to insert more resistance into the time constant circuit last mentioned, and in this manner the length of the spiral trace produced on the screen of the cathode ray tube may be increased or reduced between one and six trace convolutions.

The free-running frequency of the multivibrator described may be adjusted by manual adjustment of a cathode resistor 109 included in common in both cathode circuits of the tube 102 to vary the unidirectional bias applied to the control electrode of the tube section 102b. This effects optimum synchronized operation of the second frequency divider 14 under control of the output pulse potential from the first frequency divider 13.

The output pulse potential of the second frequency divider 14 is coupled through a condenser 110 to a voltage divider comprised by a series resistor 111 and parallel connected condenser 112, a resistor 113, and the cathode resistor 22 of the oscillator 10. A portion of the output potential pulse of the unit 14, as selected by the voltage divider last mentioned, is applied through a coaxial cable 114 and a coupling condenser 115 to the control electrode 79 of the cathode ray tube 58. The control electrode 79 is normally so biased, by adjustment of the intensity control potentiometer 74, that no visual trace is produced on the screen of the cathode ray tube 58 except for the duration of each output pulse of the second frequency divider 14. For reasons which will presently become more fully apparent, the visual trace thus produced on the screen of the tube 58 is comprised by repetitive in-register visual spiral trace convolutions originating at the same point on the cathtode ray tube screen. This point may conveniently be selected to coincide with a twelve o'clock position on the screen.

Oscillator Amplitude Control Unit 15

The oscillator amplitude control unit 15 (FIG. 2e) is comprised by a cathode follower utilizing a triode form of vacuum tube 116 having its cathode directly connected to the cathodes of the oscillator tube 20. The pulse output potential of the second frequency divider 14 is applied through the coupling condenser 110 to an input voltage divider of the unit 15 comprised by a fixed resistor 117 and a manually adjustable potentiometer 118 as shown. The adjustable contact of the potentiometer 118 is connected to the control electrode of the tube 116, and a condenser 119 is connected between the control electrode and ground potential. The positive potential developed across the cathode resistor 22 of the oscillator 10 is applied through the resistors 113 and 111 to the voltage divider comprised by the resistors 117 and 118 of the control unit 15, and a portion of this potential (depending upon the manually adjusted position of the moveable contact of the potentiometer 118) is applied as an operating bias potential to the control electrode of the tube 116 to increase its average value of anode current and thereby increase the amplitude control effect at the initiation of each spiral trace cycle.

The resistor 117 and the condenser 119 have values selected to integrate each pulse of the output potential developed by the second frequency divider 14, so that a voltage of modified sawtooth wave form is developed across the condenser 119 and is applied to the control electrode of the tube 116. A relatively small condenser 121 applies the output pulse potential of the frequency divider 14 directly to the control electrode of the tube 116. This small pulse voltage component has principal effect at the very beginning of the spiral trace cycle and effects an initial increment of increase of the anode current flowing through the tube 116. The voltage of modified sawtooth wave form applied to the control electrode of the tube 116 causes the anode current of this tube progressively to increase, and this increasing current flows through the cathode resistors 21 and 22 of the oscillator 10. The voltage drop produced by this current across the latter resistors accordingly increases and produces a corresponding decrease in the average anode currents of the triode sections of the oscillator tube 20. Such decrease of anode currents in the tube 20 decreases the amplitude of the oscillations generated by the oscillator 10.

The amplitude of oscillation of the oscillator 10 accordingly is controlled to decrease progressively from a given maximum value corresponding to minimum current of the control tube 116 to a given minimum value corresponding to maximum current of the latter as established by manual adjustment of the potentiometer 118 in adjusting the maximum amplitude of the voltage of sawtooth wave form developed across the condenser 119 and applied to the control electrode of the tube 116. It will be evident that the progressively decreasing amplitude of oscillation of the oscillator 10 causes the cathode ray tube 58 to produce a spiral trace. The principal effect of the condenser 121 is to displace the first half convolution of the spiral trace which otherwise is not sufficiently displaced, particularly at the highest operating frequency of 9.6 kilocycles, due to stray capacitance of the circuit wiring and some slight tendency of the output voltage of the frequency divider 14 to depart from a purely rectangular wave form.

It wlil be evident that the spiral trace thus produced is repetitive, and that successive traces are in register on the screen of the cathode ray tube 58 due to the synchronized operations of the units 10–15. The spiral trace accordingly appears to the observer as a fixed steady trace on the screen of the cathode ray tube and has a fixed point of origin on the latter. By virtue of this fact, a fixed distance calibration scale comprised of a series of finely scribed but very legible radial hair-lines may now be utilized in fixed relation to the trace pattern so that the operator may read distances as quickly and accurately as he would read a clock. The origin of the spiral trace pattern is conveniently established by circuit adjustment to coincide with the "twelve o'clock" vertically scribed calibration line. The pitch or spacing between successive convolutions of the spiral trace is controlled by manual adjustment of the potentiometer 118, and the length of the trace is controlled by adjustment of the potentiometer 108 of the second frequency divider 14 as earlier mentioned. The frequency division operation of the first frequency divider 13 and second frequency divider 14 is such that there are three hundred and twenty in-register spiral traces developed each second on the screen of the cathode ray tube 58 when the operating frequency of the oscillator 10 is 9.6 kilocycles per second, there are approximately one hundred and fifty trace repetitions per second when the operating frequency is 2.4 kilocycles per second, and there are seventy-five trace repetitions when the operating frequency is 1.2 kilocycles per second. These high repetition rates of the spiral trace contribute to a substantially improved trace brightness as compared to a trace repetition rate of sixty cycles per second heretofore conventionally used.

Due to the fact that the output pulse potential of the frequency divider 14 is applied to the control electrode 79 of the cathode ray tube 58 as earlier explained, only that portion of the spiral trace is rendered visible which corresponds to the period of decreasing amplitude of oscillation of the oscillator 10. It will be evident that the visual spiral time base thus established corresponds to a measurement distance of one foot in steel for each convolution of the trace when the operating frequency of the oscillator 10 is 9.6 kilocycles per second, to a distance of four feet per spiral convolution when the operating frequency is 2.4 kilocycles per second, and corresponds to a distance of eight feet per spiral convolution when the operating frequency is 1.2 kilocycles per second.

*Thyratron Pulser 16*

The pulse output voltage of the second frequency divider 14 is also applied through the condenser 110, a condenser 124, and a series resistor 125 to the control grid of a gaseous discharge tube 126 which may conveniently be of the thyratron type. The tube 126 is normally rendered non-conductive by a positive voltage applied to its cathode electrode from the moveable contact of an "indexing" potentiometer 127 which is arranged with a fixed resistor 128 as a voltage divider across a 250-volt source of unidirectional potential. This cathode voltage is stabilized by a filter condenser 129. The anode of the tube 126 is connected through an anode load resistor 130 of relatively large value to a source of relatively high unidirectional potential as shown. A resistor 131 constitutes a grid leak for the grid electrode of the tube 126. The condenser 124 and the resistor 131 differentiate each pulse of the applied pulse voltage so that the tube 126 is rendered conductive substantially on the leading edge of each voltage pulse. The initiaion of conductivity of the tube 126 thus occurs substantially coincident in time with the initiation of the visual spiral trace on the screen of the cathode ray tube 58.

During the interval when the tube 126 is non-conductive, an output coupling condenser 132 is charged through the anode resistor 130. The condenser 132 is abruptly discharged when the tube 126 becomes conductive, thus producing a large pulse or step-function voltage to shock excite an output resonant circuit comprised by manually adjustable condenser 133 and any one of four adjustable inductors 135–138 selected by manual positioning of a switch 139. A manually adjustable resistor 140 is included in this resonant circuit to introduce a selected amount of electrical loss which damps the oscillations developed in the resonant circuit by shock excitation. On large objects to be tested, the resistor 140 is usually adjusted to have minimum resistance so that the shock excited oscillations of the resonant circuit may endure for an appreciable interval and die out naturally. On small objects to be tested, or when investigating for flaws which may be close together or near the test surface, it is desirable to shorten the length of the shock excited train of oscillations and the resistor 140 is accordingly manualy adjusted to insert into the tuned circuit sufficient resistance as to shorten the length of the train of oscillations to a suitable value.

The oscillations developed across the resonant circuit last described are applied through a coaxial cable 142, a connector 143, and an additional length of coaxial cable 144 to a transducer 145 which is placed against the surface of the object to be tested. The first half cycle or so of the oscillatory energy applied to the transducer 145 shock excites the transducer into vibration at its natural frequency and thus causes the transducer to send a train of ultrasonic frequency mechanical vibrations into the object to be tested. Transducers having any of four natural frequencies may be connected through the connector 143 to the ultrasonic inspection system. The relatively low inspection frequency of 0.5 megacycle is ordinarily used for relatively long bodies to be inspected or when looking for relatively coarse flaws having appreciable spacings, and the highest frequency of 5 megacycles is ordinarily used when inspecting over relatively short distances or when looking for flaws of fine structure or those which may be close together or near the test surface. The switch 139 is manually positioned to select that one of the inductors 135–138 which resonates with the condenser 133 at the resonant frequency of the transducer selected for a given test, and the condenser 133 is then manually adjusted in the nature of a vernier tuning control to insure that the resonant circuit is closely tuned to the transducer frequency. The major frequency adjustments of these resonant circuits are made at the factory, and possibly thereafter at infrequent intervals in the field, by adjustment of the values of inductance of the inductors 135–138. In connection with the shock excitation of the transducer 145 as just described, it may be noted that the value of resistance selected by manual adjustment of the resistor 140 affects not only the damping of the wave train of the thyratron pulser resonant output circuit as earlier mentioned but also is effective to damp the train of mechanical vibrations created by the transducer 145.

The adjustments of the potentiometer 127 in adjusting the cathode bias of the tube 126 slightly change the time at which the tube 126 becomes conductive with respect the leading edge of each pulse of output voltage from the frequency divider 14. This is because the pulse output voltage does not in practice have a perfectly rectangular wave form but rather has a slight slope at its leading edge. The setting of the potentiometer 127 thus provides a small range of control over the time at which the tube 126 becomes conductive, and may be so adjusted that the first half cycle of oscillations developed by shock excitation in the output circuit of the thyratron pulser 16 always begins on the zero reference hair-line mark corresponding to the origin of the visual spiral trace of the cathode ray tube 58.

The repetition rate of approximately three hundred pulses per second of the output pulse potential of the second frequency divider 14 allows sufficient time for the output coupling condenser 132 to charge to nearly the full value of the applied unidirectional potential before the condenser is discharged again by the conductive state of the tube 126. This repetition rate also allows sufficient time for all echoes even in large test bodies to return to the transducer 145 before another test train of vibrations is injected into the body by the transducer. The repetition rate is, however, sufficiently high as to enable a relatively bright trace pattern to be produced by the cathode ray tube so that observation of the pattern may readily be made under ordinary daylight conditions and without the need to shield ambient light from the face of the cathode ray tube.

*Signal Amplifier 19*

Mechanical vibration pulse trains injected by the transducer 145 into the body to be tested are reflected by defects or flaws in the body. These echo vibrations return to the transducer 145 and are converted by the latter into corresponding electrical voltage oscillations which are then translated back through the coaxial cable 144 and the connector 143 to the input circuit of the signal amplifier 19.

The signal amplifier is comprised by four stages of amplification utilizing amplifier tubes 148–151. These stages have a conventional construction and provide relatively wide band width. The resonant output circuit of the thyratron pulser 16 is so closely coupled by the coaxial cable 142 to the input of the amplifier as also effectively to constitute a tuned input circuit of the latter. The anode circuit of the last amplifier stage utilizing the vacuum tube 151 is also of the tuned type and includes a switch 152, mechanically connected for unicontrol operation with the switch 139 as indicated by the broken line, which selects one of four adjustable inductors 153–156. These inductors are factory adjusted to be tuned by the inherent distributed capacitance of the anode and anode circuit of the tube 151 to the same resonant frequencies as the inductors 135–138 of the thyratron pulser 16. Accordingly the input and output circuits of the signal amplifier 19 are resonant at the same operating frequency, as selected by manual positioning of the switches 139 and 152 to correspond with the resonant frequency of the transducer selected for a given test. The relatively heavy anode current of the tube 151 provides very effective damping to suppress excessive ringing in its tuned output circuit.

The signal amplifier 19 is so designed in conventional manner that it has at seventy percent of maximum amplitude of the amplifier frequency-amplitude response characteristic an overall band width of approximately one-tenth the nominal operating frequency. Thus the band width for the 5 megacycle operating frequency is approximately 0.5 megacycle and for the 0.5 megacycle operating frequency is approximately 50 kilocycles. With the exception that the first amplifier stage which includes the tube 148 does not have a cathode by-pass condenser, so that the first stage operates with a small amount of degeneration, all of the amplifier stages are of similar circuit arrangement. For example, each has an anode inductor L1 and shunt connected resistor R1 providing a conventional peaking network, and each has an inductor L2 and resistor R2 which comprises the anode load impedance for the stage. A filter network comprising a series resistor 157 and shunt condenser 158 decouples each stage from the source of anode energizing potential. The signal amplifier 19 has a manual gain control comprised by a manually adjustable potentiometer 159 which is included with a resistor 160 in a voltage divider connected across the source of anode energizing potential. The adjustable contact of the potentiometer 159, shunted by a filter condenser 161, is connected in common to the screen electrode of each of the vacuum tubes 148–150 to vary the amplification or gain of each amplifier stage by control of the screen electrode operating potential.

The echo oscillations applied by the transducer 145 to the signal amplifier are amplified by the latter to an extent varying with the manual adjustment of the gain control potentiometer 159, and the amplified oscillations are coupled from the anode circuit of the last amplifier stage through a condenser 162 and a low loss, low capacitance coaxial line 163 to a radial deflection electrode 164 of the cathode ray tube 58. A resistor 165 maintains the average potential of the radial deflection electrode 164 at ground potential. It was earlier mentioned that the resonant output circuit of the thyratron pulser 16 is effectively also included in the input circuit of a signal amplifier 19, and that the condenser 133 is manually adjustable to provide a fine tuning control by which the frequency of this resonant circuit is accurately adjusted to the frequency of the transducer used at any time. This insures that the cleanest and strongest echo signals are supplied by the transducer 145 to the control grid of the first amplifier stage 148, and enables optimum amplification of the echo signals. The resonant input and output circuits of the signal amplifier at the same time provide effective and substantial reduction of spurious responses which the transducer 145 tends to generate when excited by the shock excitation of the thyratron pulser 16. In the absence of these resonant input and output circuits, the otherwise broad band signal amplifier would amplify these spurious vibrations of the transducer and would create confusion in the echo signals observed on the cathode ray tube trace. A wide band amplifier of the type here employed is not subject to "ringing" or continued oscillation of its circuits following termination of an applied alternating current signal. This fact in conjunction with the use of resonant input and output circuits effects optimum amplification with high fidelity of the echo oscillation trains applied to the amplifier by the transducer 145, so that an inspection system embodying the invention is able to indicate separate echo oscillations closely spaced in time and resulting from closely spaced defects or flaws or thin sections of the body inspected. This is true even in the presence of strong or large intensity echo pulses applied to the amplifier and is especially important in connection with the shock excitation oscillation train generated by the thyratron pulses 16, which is inherently also applied to the input circuit of the amplifier. The amplifier may temporarily be blocked or paralyzed by grid current drawn by the control grids of its amplifier stages during the generation of the test oscillation pulse train by the thyratron pulser 16, but the time constants of the amplifier input circuits are sufficiently short that the amplifier recovers quickly and for the 5 megacycle operating frequency ultrasonic echoes from the transducer 145 may be amplified after eight microseconds from the start of the first half cycle of test pulse oscillation.

From the foregoing description of the invention, it will be apparent that an ultrasonic inspection system embodying the invention has the advantages that it may have an exceptionally compact and sturdy yet light weight construction, while at the same time having high operating stability and sensitivity with substantially improved accuracy of flaw indication over a wide range of indication conditions. The ultrasonic inspection system of the invention has the additional advantages that it requires a minimum number of operating adjustments, which may be effected in a simple manner and at will to accomplish operations with high operating stability over a wide range of test conditions providing optimum detection of diverse flaw characteristics. There is the further advantage that the inspection system of the invention enables the use of a much smaller size cathode ray tube than has heretofore been feasible while yet enabling the attainment of a much longer sweep trace and accompanying material improvement in the accuracy of indications provided.

While a specific form of the invention has been described for purposes of illustration, it is contemplated that possible changes may be made without departing from the spirit of the invention.

I claim:

1. A ultrasonic inspection system comprising, a cathode ray tube having a radial deflection electrode and pairs of quadrature-related deflection electrodes, an oscillatory system including a tuned transformer having a magnetic ceramic core, means for controlling cyclically at a preselected cyclic period the amplitude of oscillations of said oscillatory system, means responsive to the oscillations of said oscillatory system for energizing said pairs of deflection electrodes with periodically-varying-amplitude quadrature-phase-related voltages to cause said tube to reproduce in-register visual spiral trace convolutions initiated at a preselected angular orientation established by said control means and including a preselected number of spiral trace convolutions also controlled by said control means, a rectifier system including a high-frequency oscillator and a high voltage step-up transformer energized thereby and having a magnetic ceramic core for developing and applying to said tube a high unidirectional energizing voltage, electro-mechanical transducer means, means controlled by said control means for pulse energizing said transducer means substantially at the initiation of each spiral trace to generate a corresponding ultrasonic inspection pulse train of vibrations for application to an object to be inspected, and means coupling said transducer means to said radial deflection electrode to display by radial deflections on said spiral trace a visual indication which by angular reference to said preselected orientation and the frequency of said oscillator means provides an accurate measure of the transit times of inspection pulse trains of vibrations applied to said object and returned by reflection to said transducer means.

2. An ultrasonic inspection system comprising, cathode-ray tube display means having an electron-beam intensity control electrode operatively biased normally to extinguish any display by said means, an oscillator for continuously generating sinusoidal oscillations, cyclically operative control means synchronously responsive to said generated oscillations for controlling said oscillator to vary periodically the amplitude of oscillation thereof, means responsive to said generated oscillations for applying to pairs of cathode-ray beam deflection electrodes of said display means quadrature-phase-related oscillations having amplitudes periodically varying together in the same sense to enable reproduction by said display means of recurrent in-register spiral traces, means included in said oscillation amplitude control means for applying to said control electrode substantially coincident with the initiation of each said oscillation amplitude variation a visual-display pulse potential whereby to effect the visual reproduction by said display means of a spiral trace pattern initiated at a preselected angular orientation established by said control means and including spiral trace convolutions of preselected number controlled by said control means, means including a transducer for generating substantially coincidentally with the initiation of each said pattern an ultrasonic energy inspection pulse for application to an object to be inspected, and means responsive to ultrasonic pulse energy received by said transducer after translation through said object during the visual trace interval for controlling said display means to produce on said trace a visual indication which by angular reference to said preselected orientation and the oscillator frequency provides an accurate measure of the transit time of said translated pulse energy.

3. An ultrasonic inspection system comprising, cathode-ray tube display means, an oscillator for continuously generating sinusoidal oscillations, cyclically operative control means synchronously responsive to said generated oscillations for controlling said oscillator to vary periodically the amplitude of oscillation thereof, means responsive to said generated oscillations for applying to pairs of cathode-ray beam deflection electrodes of said display means quadrature-phase-related oscillations having amplitudes periodically varying together in the same sense to enable reproduction by said display means of recurrent in-register spiral traces, means included in said oscillation amplitude control means for controlling at least one of said aforesaid means to effect the visual reproduction by said display means of a spiral trace pattern initiated at a preselected angular orientation established by said control means and including spiral trace convolutions of preselected number controlled by said control means, means including a transducer for generating substantially coincidentally with the initiation of each said pattern an ultrasonic energy inspection pulse for application to an object to be inspected, and means responsive to ultrasonic pulse energy received by said transducer after translation through said object during the visual trace interval for controlling said display means to produce on said trace a visual indication which by angular reference to said preselected orientation and the oscillator frequency provides an accurate measure of the transit time of said translated pulse energy.

4. An ultrasonic inspection system comprising, cathode-ray tube display means having an electron-beam intensity control electrode operatively biased normally to extinguish any display by said means, an oscillator for continuously generating sinusoidal oscillations, control means cyclically operative at an integral multiple of the periodicity of said generated oscillations for controlling said oscillator to vary periodically at said integral-multiple periodicity the amplitude of oscillation of said oscillator, means responsive to said generated oscillations for applying to pairs of cathode-ray beam deflection electrodes of said display means quadrature-phase-related oscillations having amplitudes varying together in the same sense and periodically between predetermined limits to enable reproduction by said display means of recurrent in-register spiral traces, means included in said oscillation amplitude control means for applying to said control electrode substantially coincident with the initiation of each said oscillation amplitude variation a visual-display pulse potential whereby to effect the visual reproduction by said display means of a spiral trace pattern initiated at a preselected angular orientation established by said control means and including spiral trace convolutions of preselected number controlled by said control means, a transducer, means controlled by said last-named means for generating and applying to said transducer substantially coincidentally with the initiation of each said pattern a potential pulse to cause said transducer to generate an ultrasonic energy inspection pulse for application to an object to be inspected, and means responsive to ultrasonic pulse energy received by said transducer after translation through said object during the visual trace interval for controlling said display means to produce on said trace visual indication which by angular reference to said preselected orientation and the oscillator frequency provides an accurate measure of the transit time of said translated pulse energy.

5. An ultrasonic inspection system comprising, cathode-ray tube display means having an electron-beam intensity control electrode operatively biased normally to extinguish any display by said means, an oscillator for continuously generating sinusoidal oscillations, control means cyclically operative at an integral multiple of the periodicity of said generated oscillations for controlling said oscillator to vary periodically at said integral-multiple periodicity the amplitude of oscillation of said oscillator, means responsive to said generated oscillations for applying to pairs of cathode-ray beam deflection electrodes of said display means quadrature-phase-related oscillations having amplitudes varying together in the same sense and periodically between predetermined limits to enable reproduction by said display means of recurrent in-register spiral traces, said control means including adjustable means and means for developing a pulse potential of duration controlled by said adjustable means and for applying said potential to an electron-beam intensity control electrode of said display means to effect the visual reproduction thereby of a spiral trace pattern initiated at a preselected angular orientation established by said control means and including by adjustment of said adjustable means a selectable number of spiral trace convolutions, means including a transducer for generating substantially coincidentally with the initiation of each said pattern an ultrasonic energy inspection pulse for application to an object to be inspected, and means responsive to ultrasonic pulse energy received by said transducer after translation through said object during the visual trace interval for controlling said display means to produce on said trace a visual indication which by angular reference to said preselected orientation and the oscillator frequency provides an accurate measure of the transit time of said translated pulse energy.

6. An ultrasonic inspection system comprising, cathode-ray tube display means having an electron-beam intensity control electrode operatively biased normally to extinguish any display by said means, an oscillator for continuously generating sinusoidal oscillations, control means for controlling said oscillator to vary the amplitude of oscillation thereof between preselectable amplitude limits and during each of successive intervals corresponding to a multiple of the period of said oscillations, means responsive to said generated oscillations for applying to pairs of cathode-ray beam deflection electrodes of said display means quadrature-phase-related oscillations having amplitudes varying together in the same sense and periodically between predetermined limits to enable reproduction by said display means of recurrent in-register spiral traces, means included in said oscillation amplitude control means for applying to said control electrode substantially coincident with the initiation of each said oscillation amplitude variation a visual-display pulse potential whereby to effect the visual reproduction by said display means of a spiral trace pattern initiated at a preselected angular orientation established by said control means and including spiral trace convolutions of preselected number controlled by said control means, means including a transducer for generating substantially coincidentally with the initiation of each said pattern an ultrasonic energy inspection pulse for application to an object to be inspected, and means responsive to ultrasonic pulse energy received by said transducer after translation through said object during the visual trace interval for controlling said display means to produce on said trace a visual indication which by angular reference to said preselected orientation and the oscillator frequency provides an accurate measure of the transit time of said translated pulse energy.

7. An ultrasonic inspection system comprising, cathode-ray tube display means having pairs of perpendicular oriented electrostatic deflection electrodes and a radial deflection electrode, an oscillator for continuously generating sinusoidal oscillations, cyclically operative control means synchronously responsive to said generated oscillations for controlling said oscillator to vary periodically the amplitude of oscillation thereof, means responsive to said generated oscillations for applying to said pairs of deflection electrodes quadrature-phase-related oscillations having amplitudes periodically varying together in the same sense to enable reproduction by said display means of recurrent in-register spiral traces, means included in said oscillation amplitude control means for applying to said control electrode substantially coincident with the initiation of each said oscillation amplitude variation a visual-display pulse potential whereby to effect the visual reproduction by said display means of a spiral trace pattern initiated at a preselected angular orientation established by said control means and including spiral trace convolutions of preselected number controlled by said control means, means including a transducer for generating substantially coincidentally with the initiation of each said pattern an ultrasonic energy inspection pulse for application to an object to be inspected, and means coupled to said radial deflection electrode and responsive to ultrasonic pulse energy received by said transducer after translation through said object during the visual trace interval for radially deflecting said trace to produce a visual indication which by angular reference to said preselected orientation and the oscillator frequency provided an accurate measure of the transit time of said translated pulse energy.

8. An ultrasonic inspection system comprising, cathode-ray tube display means having an electron-beam intensity control electrode operatively biased normally to extinguish any display by said means, an oscillator for continuously generating sinusoidal oscillations at any of plural step-selectable frequencies, control means having a cyclic operation at an integral multiple of the periodicity of said generated oscillations at any of said selectable frequencies thereof for controlling said oscillator to vary at a preselected periodicity the amplitude of oscillation thereof, means responsive to said generated oscillations for applying to pairs of cathode-ray beam deflection electrodes of said display means quadrature-phase-related oscillations having amplitudes varying together in the same sense and periodically between predetermined limits to enable reproduction by said display means of recurrent in-register spiral traces, means included in said oscillation amplitude control means for applying to said control electrode substantially coincident with the initiation of each said oscillation amplitude variation a visual-display pulse potential whereby to effect the visual reproduction by said display means of a spiral trace pattern initiated at a preselected angular orientation established by said control means and including spiral trace convolutions of preselected number controlled by said control means, means including a transducer for generating substantially coincidentally with the initiation of each said pattern an ultrasonic energy inspection pulse for application to an object to be inspected, and means responsive to ultrasonic pulse energy received by said transducer after translation through said object during the visual trave interval for controlling said display means to produce on said trace a visual indication which by angular reference to said preselected orientation and the oscillator frequency provides an accurate measure of the transit time of said translated pulse energy.

9. An ultrasonic inspection system comprising, cathode-ray tube display means having an electron-beam intensity control electrode operatively biased normally to extinguish any display by said means, an oscillator of relatively stable frequency for continuously generating sinusoidal oscillations, control means having a cyclic operation controlled by said generated oscillations but having a cyclic period equal to a multiple of the period of said oscillations for controlling said oscillator to decrease uniformly with time during at least a portion of each cyclic period of said control means the amplitude of oscillation of said oscillator, means responsive to said generated oscillations for applying to pairs of cathode-ray beam deflection electrodes of said display means quadrature-phase-related oscillations having amplitudes varying together in the same sense and periodically between predetermined limits to enable reproduction by said display means of recurrent in-register spiral traces of preselected spiral pitch, means included in said oscillation amplitude control means for applying to said control electrode substantially coincident with the initiation of each said oscillation amplitude variation a visual-display pulse potential whereby to effect the visual reproduction by said display means of a spiral trace pattern initiated at a preselected angular orientation established by said control means and including spiral trace convolutions of preselected number controlled by said control means, means including a transducer for generating substantially coincidentally with the initiation of each said pattern an ultrasonic energy inspection pulse for application to an object to be inspected, and means responsive to ultrasonic pulse energy received by said transducer after translation through said object during the visual trace interval for controlling said display means to produce on said trace a visual indication which by angular reference to said preselected orientation and the oscillator frequency provides an accurate measure of the transit time of said translated pulse energy.

10. An ultrasonic inspection system comprising, cathode-ray tube display means having an electron-beam intensity control electrode operatively biased normally to extinguish any display by said means, an oscillator for continuously generating sinusoidal oscillations, means including frequency-divider means controlled by said oscillator for generating and applying to said oscillator an oscillation amplitude control bias potential varying in amplitude during a portion of each of recurrent intervals corresponding to a multiple of the period of said generated oscillations, means responsive to said generated oscillations for applying to pairs of cathode-ray beam deflection electrodes of said display means quadrature-phase-related oscillations having amplitudes varying together in the same sense and periodically between predetermined limits to enable reproduction by said display means of recurrent in-register spiral traces, means included in said frequency-divider means for generating and applying to said control electrode of said display means a control bias potential of substantially constant amplitude during said portion of said each recurrent interval to effect the visual reproduction by said display means of a trace pattern initiated at a preselected angular orientation established by said frequency-divider means and including spiral trace convolutions of preselected number controlled by said frequency-divider means, means including a transducer for generating substantially coincidentally with the initiation of each said pattern an ultrasonic energy inspection pulse for application to an object to be inspected, and means responsive to ultrasonic pulse energy received by said transducer after translation through said object during the visual trace interval for controlling said display means to produce on said trace a visual indication which by angular reference to said preselected orientation and the oscillator frequency provides an accurate measure of the transit time of said translated pulse energy.

11. An ultrasonic inspection system comprising, cathode-ray tube display means having an electron-beam intensity control electrode operatively biased normally to extinguish any display by said means, an oscillator for continuously generating sinusoidal oscillations, a means including two-stage tandem-connected frequency divider controlled by said oscillator for generating and applying to said oscillator an oscillation amplitude control bias potential varying in amplitude substantially linearly with time throughout a portion of each of recurrent intervals corresponding to a multiple of the period of said generated oscillations, means responsive to said generated oscillations for applying to pairs of cathode-ray beam deflection electrodes of said display means quadrature-phase-related oscillations having amplitudes periodically varying together in the same sense and substantially linearly with time to enable reproduction by said display means of recurrent in-register spiral traces, means responsive to an output voltage of said frequency divider for developing and applying to said control electrode of said display means a visual-display control bias potential of substantially constant value during said portion of said each recurrent interval to effect the visual reproduction by said display means of a trace pattern initiated at a preselected angular orientation established by said frequency divider and including spiral trace convolutions of preselected number controlled by said frequency divider, means including a transducer for generating substantially coincidentally with the initiation of each said pattern an ultrasonic energy inspection pulse for application to an object to be inspected, and means responsive to ultrasonic pulse energy received by said transducer after translation through said object during the visual trace interval for controlling said display means to produce on said trace a visual indication which by angular reference to said preselected orientation and the oscillator frequency provides an accurate measure of the transit time of said translated pulse energy.

12. An ultrasonic inspection system comprising: cathode-ray tube display means having an electron-beam intensity control electrode operatively biased normally to extinguish any display by said means; an oscillator for continuously generating sinusoidal oscillations; a first frequency divider responsive to said oscillations for generating voltage pulses synchronous with said oscillations and of periodicity equal to or less than the periodicity of said oscillations; a second frequency divider means controlled by said first frequency divider to generate at a lesser periodicity than said pulses a second voltage of pulse waveform having constant pulse amplitude during a trace interval, a third voltage having substantially linear sawtooth waveform during said trace interval, and a fourth voltage of peaked-pulse waveform; means for utilizing said third voltage to vary the oscillation amplitude of said oscillator; means responsive to said generated oscillations for applying to pairs of cathode-ray beam deflection electrodes of said display means quadrature-phase-related oscillations having amplitudes periodically varying together in the same sense to enable reproduction by said display means of recurrent in-register spiral traces; means for applying said second voltage to said control electrode of said display means to effect the visual reproduction by said display means of a trace pattern initiated at a preselected angular orientation established by said frequency dividers and including spiral trace convolutions of preselected number controlled by said frequency dividers; a transducer; means for energizing said transducer with said fourth voltage to generate substantially coincidentally with the initiation of each said pattern an ultrasonic energy inspection pulse for application to an object to be inspected; and means responsive to ultrasonic pulse energy received by said transducer after translation through said object during the visual trace interval for controlling said display means to produce on said trace a visual indication which by angular reference to said preselected orientation and the oscillator frequency provides an accurate measure of the transit time of said translated pulse energy.

13. An ultrasonic inspection system comprising, cathode-ray tube display means having an electron-beam intensity control electrode operatively biased normally to extinguish any display by said means, an oscillator for continuously generating sinusoidal oscillations, cyclically operative control means synchronously responsive to said generated oscillations for controlling said oscillator to vary periodically the amplitude of oscillation thereof, means responsive to said generated oscillations for applying to pairs of cathode-ray beam deflection electrodes of said display means quadrature-phase-related oscillations having amplitudes periodically varying together in the same sense to enable reproduction by said display means of recurrent in-register spiral traces, means included in said oscillation amplitude control means for applying to said control electrode substantially coincident with the initiation of each said oscillation amplitude variation a visual-display pulse potential whereby to effect the visual reproduction by said display means of a spiral trace pattern initiated at a preselected angular orientation established by said control means and including spiral trace convolutions of preselected number controlled by said control means, means including a transducer for generating substantially coincidentally with the initiation of each said pattern an ultrasonic energy inspection pulse train of vibrations for application to an object to be inspected, and means coupling said transducer to said display means and having maximized response at the periodicity of said vibrations to translate ultrasonic pulse energy received by said transducer after translation through said object during the visual trace interval and produce on said trace a visual indication which by angular reference to said preselected orientation and the oscillator frequency provides an accurate measure of the transit time of said translated pulse energy.

14. An ultrasonic inspection system comprising, cathode-ray tube display means having an electron-beam intensity control electrode operatively biased normally to extinguish any display by said means, an oscillator for continuously generating sinusoidal oscillations, cyclically operative control means synchronously responsive to said generated oscillations for controlling said oscillator to vary periodically the amplitude of oscillation thereof, means responsive to said generated oscillations for applying to pairs of cathode-ray beam deflection electrodes of said display means quadrature-phase-related oscillations having amplitudes periodically varying together in the same sense to enable reproduction by said display means of recurrent in-register spiral traces, means included in said oscillation amplitude control means for applying to said control electrode substantially coincident with the initiation of each said oscillation amplitude variation a visual-display pulse potential whereby to effect the visual reproduction by said display means of a spiral trace pattern initiated at a preselected angular orientation established by said control means and including spiral trace convolutions of preselected number controlled by said control means, means including a transducer for generating substantially coincidentally with the initiation of each said pattern an ultrasonic energy inspection pulse train of vibrations for application to an object to be inspected, and a wide band amplifier having input and output circuits tuned to the periodicity of said vibrations and respectively coupled to said transducer and display means to translate ultrasonic pulse energy received by said transducer after translation through said object during the visual trace interval and produce on said trace a visual indication which by angular reference to said preselected orientation and the oscillator frequency provides an accurate measure of the transit time of said translated pulse energy.

15. An ultrasonic inspection system comprising, cathode-ray tube display means having an electron-beam intensity control electrode operatively biased normally to extinguish any display by said means, an oscillator for continuously generating sinusoidal oscillations, cyclically operative control means synchronously responsive to said generated oscillations for controlling said oscillator to vary periodically the amplitude of oscillation thereof, means responsive to said generated oscillations for applying to pairs of cathode-ray beam deflection electrodes of said display means quadrature-phase-related oscillations having amplitudes periodically varying together in the same sense to enable reproduction by said display means of recurrent in-register spiral traces, means included in said control means for applying to said control electrode substantially coincident with the initiation of each said oscillation amplitude variation a visual-display pulse potential whereby to effect the visual reproduction by said display means of a spiral trace pattern initiated at a preselected angular orientation established by said control means, means included in said control means selectively to adjust the pulse duration of said pulse potential to adjust the trace interval of said trace convolutions and select the maximum value of transit time which may be displayed by said display means, means including a transducer for generating substantially coincidentally with the initiation of each said pattern an ultrasonic energy inspection pulse for application to an object to be inspected, and means responsive to ultrasonic pulse energy received by said transducer after translation through said object during the visual trace interval for controlling said display means to produce on said trace a visual indication which by angular reference to said preselected orientation and the oscillator frequency provides an accurate measure of the transit time of said translated pulse energy.

16. An ultrasonic inspection system comprising, cathode-ray tube display means having an electron-beam intensity control electrode operatively biased normally to extinguish any display by said means, an oscillator for continuously generating sinusoidal oscillations, cyclically operative control means synchronously responsive to said generated oscillations and including first manually adjustable means for controlling said oscillator to vary periodically the amplitude of oscillation thereof throughout each of recurrent intervals of duration selected by adjustment of said manual means, means responsive to said generated oscillations for applying to pairs of cathode-ray beam deflection electrodes of said display means quadrature-phase-related oscillations having amplitudes periodically varying together in the same sense to enable reproduction by said display means of recurrent in-register spiral traces, second manually adjusted means included in said control means to adjust the rate of change of oscillation amplitude and thereby the pitch of said spiral traces, means included in said control means for developing and applying to said control electrodes of said display means a visual-display pulse potential of pulse duration controlled by said first manually adjustable means to effect the visual reproduction by said display means of a spiral trace pattern initiated at a preselected angular orientation established by said control means and including spiral trace convolutions of preselected number controlled by adjustment of said first manual means, means including a transducer for generating substantially coincidentally with the initiation of each said pattern an ultrasonic energy inspection pulse for application to an object to be inspected, means responsive to ultrasonic pulse energy received by said transducer after translation through said object during the visual trace interval for controlling said display means to produce on said trace a visual indication which by angular reference to said preselected orientation and the oscillator frequency provides an accurate measure of the transit time of said translated pulse energy, and third manually adjustable means for adjusting the frequency of said oscillator to adjust the value of transit time corresponding to each complete spiral trace convolution of said display means.

17. An ultrasonic inspection system comprising, cathode-ray tube display means having an electron-beam intensity control electrode operatively biased normally to extinguish any display by said means, an oscillator for continuously generating sinusoidal oscillations, cyclically operative control means synchronously responsive to said generated oscillations for controlling said oscillator to vary periodically the amplitude of oscillation thereof, means responsive to said generated oscillations for applying to pairs of cathode-ray beam deflection electrodes of said display means quadrature-phase-related oscillations having amplitudes periodically varying together in the same sense to enable reproduction by said display means of recurrent in-register spiral traces, means included in said oscillation amplitude control means for applying to said control electrode substantially coincident with the initiation of each said oscillation amplitude variation a visual-display pulse potential whereby to effect the visual reproduction by said display means of a spiral trace pattern initiated at a preselected angular orientation established by said control means and including spiral trace convolutions of preselected number controlled by said control means, a transducer energized by said control means for generating substantially coincidentally with the initiation of each said pattern an ultrasonic energy inspection pulse for application to an object to be inspected, and means responsive to ultrasonic pulse energy received by said transducer after translation through said object during the visual trace interval for controlling said display means to produce on said trace a visual indication which by angular reference to said preselected orientation and the oscillator frequency provides an accurate measure of the transit time of said translated pulse energy.

References Cited in the file of this patent

UNITED STATES PATENTS

| | | |
|---|---|---|
| 2,408,415 | Donaldson | Oct. 1, 1946 |
| 2,449,792 | Snyder | Sept. 21, 1948 |
| 2,458,771 | Firestone | Jan. 11, 1949 |
| 2,728,405 | Brant | Dec. 27, 1955 |

FOREIGN PATENTS

| | | |
|---|---|---|
| 124,879 | Australia | May 20, 1948 |
| 557,020 | Italy | Feb. 12, 1957 |

UNITED STATES PATENT OFFICE
CERTIFICATE OF CORRECTION

Patent No. 3,144,764                                August 18, 1964

William C. Harmon

It is hereby certified that error appears in the above numbered patent requiring correction and that the said Letters Patent should read as corrected below.

Column 1, line 10, for "equipment" read -- equipments --; column 2, line 46, for "tweny" read -- twenty --; column 6, line 49, for "(FIG. 2d)" read -- (FIG. 2c) --; column 7, line 34, after "74" insert -- (FIG. 2d) --; line 61, for "76-78" read -- 74-78 --; column 8, line 6, after "shown" insert -- in detail, --; line 19, for "sources" read -- source --; column 12, line 9, for "manualy" read -- manually --; column 17, line 75, strike out "pro-"; column 18, line 1, for "vided" read -- provides --; column 19, lines 42 and 43, for "a means including" read -- means including a --.

Signed and sealed this 20th day of April 1965.

(SEAL)
Attest:

ERNEST W. SWIDER                             EDWARD J. BRENNER
Attesting Officer                              Commissioner of Patents